(12) United States Patent
Solomon et al.

(10) Patent No.: US 7,940,522 B2
(45) Date of Patent: *May 10, 2011

(54) PORTABLE COMPUTER DOCKING STATION

(75) Inventors: Mark Solomon, Cypress, TX (US);
Kevin Massaro, Houston, TX (US);
Brett Faulk, Cypress, TX (US);
Jonathan Harris, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 78 days.

This patent is subject to a terminal disclaimer.

(21) Appl. No.: 12/356,718

(22) Filed: Jan. 21, 2009

(65) Prior Publication Data

US 2009/0122482 A1 May 14, 2009

Related U.S. Application Data

(62) Division of application No. 10/944,641, filed on Sep. 17, 2004, now Pat. No. 7,502,225.

(51) Int. Cl.
*G06F 1/16* (2006.01)

(52) U.S. Cl. ......... 361/679.41; 361/679.55; 361/679.09; 361/679.37; 248/917

(58) Field of Classification Search ............. 361/679.41, 361/679.21, 679.26, 679.09, 679.55, 679.33–679.39, 361/679.4; 248/917–924
See application file for complete search history.

(56) References Cited

U.S. PATENT DOCUMENTS

| | | | | |
|---|---|---|---|---|
| 5,619,397 A * | 4/1997 | Honda et al. | ............. | 361/679.43 |
| 5,751,546 A * | 5/1998 | Clark et al. | ............. | 361/679.43 |
| 6,043,976 A * | 3/2000 | Su | ............. | 361/679.41 |
| 6,256,193 B1 * | 7/2001 | Janik et al. | ............. | 361/679.59 |
| 6,926,130 B2 * | 8/2005 | Skowronski | ............. | 191/12.2 R |
| 7,038,906 B2 * | 5/2006 | Hubbard | ............. | 361/679.09 |
| 2002/0025832 A1 * | 2/2002 | Durian et al. | ............. | 455/556 |
| 2005/0207110 A1 * | 9/2005 | Wang et al. | ............. | 361/686 |
| 2005/0280984 A1 * | 12/2005 | Huang et al. | ............. | 361/686 |

* cited by examiner

*Primary Examiner* — Jayprakash N Gandhi
*Assistant Examiner* — Ingrid Wright

(57) ABSTRACT

A portable computer docking station comprises a cradle coupled to a docking base where the cradle is adapted to receive a portable computer. The docking station also comprises a wireless receiver adapted to communicate a wireless input signal received by the docking station to the portable computer.

8 Claims, 6 Drawing Sheets

PORTABLE COMPUTER DOCKING STATION

CROSS REFERENCE TO RELATED APPLICATIONS

This application is a divisional application of U.S. patent application having Ser. No. 10/944,641 filed Sep. 17, 2004 now U.S. Pat. No. 7,502,225.

BACKGROUND

Portable computers are being increasingly used for both mobile and workstation or desktop applications or environments. For example, portable computers are generally used independently as a mobile device and as an office or desktop workstation via a docking station, thereby enabling the portable computer to be used as a desktop or workstation system while providing mobile convenience as well. However, conserving desktop work space and providing an ergonomic environment for using the portable computer in a desktop application is an important design objective.

SUMMARY OF THE INVENTION

In accordance with one embodiment of the present invention, a portable computer docking station comprises a cradle coupled to a docking base where the cradle is adapted to receive a portable computer. The docking station also comprises a wireless receiver adapted to communicate a wireless input signal received by the docking station to the portable computer.

In accordance with another embodiment of the present invention, a portable computer docking station comprises a cradle pivotally coupled to a docking base where the docking base is adapted to be communicatively coupled to a portable computer disposed in the cradle. The cradle is also adapted to support the portable computer in a display-open position.

In accordance with yet another embodiment of the present invention, a portable computer docking station comprises a cradle pivotally coupled to a docking base where the cradle is adapted to receive a portable computer. The docking station also comprises at least one connector element adapted to releasably engage the portable computer to communicatively couple the portable computer to the docking base. The docking station further comprises at least one actuation element adapted to releasably secure the cradle in at least one of a plurality of pivot positions relative to the docking base.

In accordance with yet another embodiment of the present invention, a portable computer docking station comprises a cradle coupled to a docking base where the cradle is adapted to receive a portable computer. The portable computer docking station also comprises an interchangeable drive assembly removably couplable to the docking base.

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF THE DRAWINGS

The preferred embodiments of the present invention and the advantages thereof are best understood by referring to FIGS. 1-7 of the drawings, like numerals being used for like and corresponding parts of the various drawings.

Figure 1A:
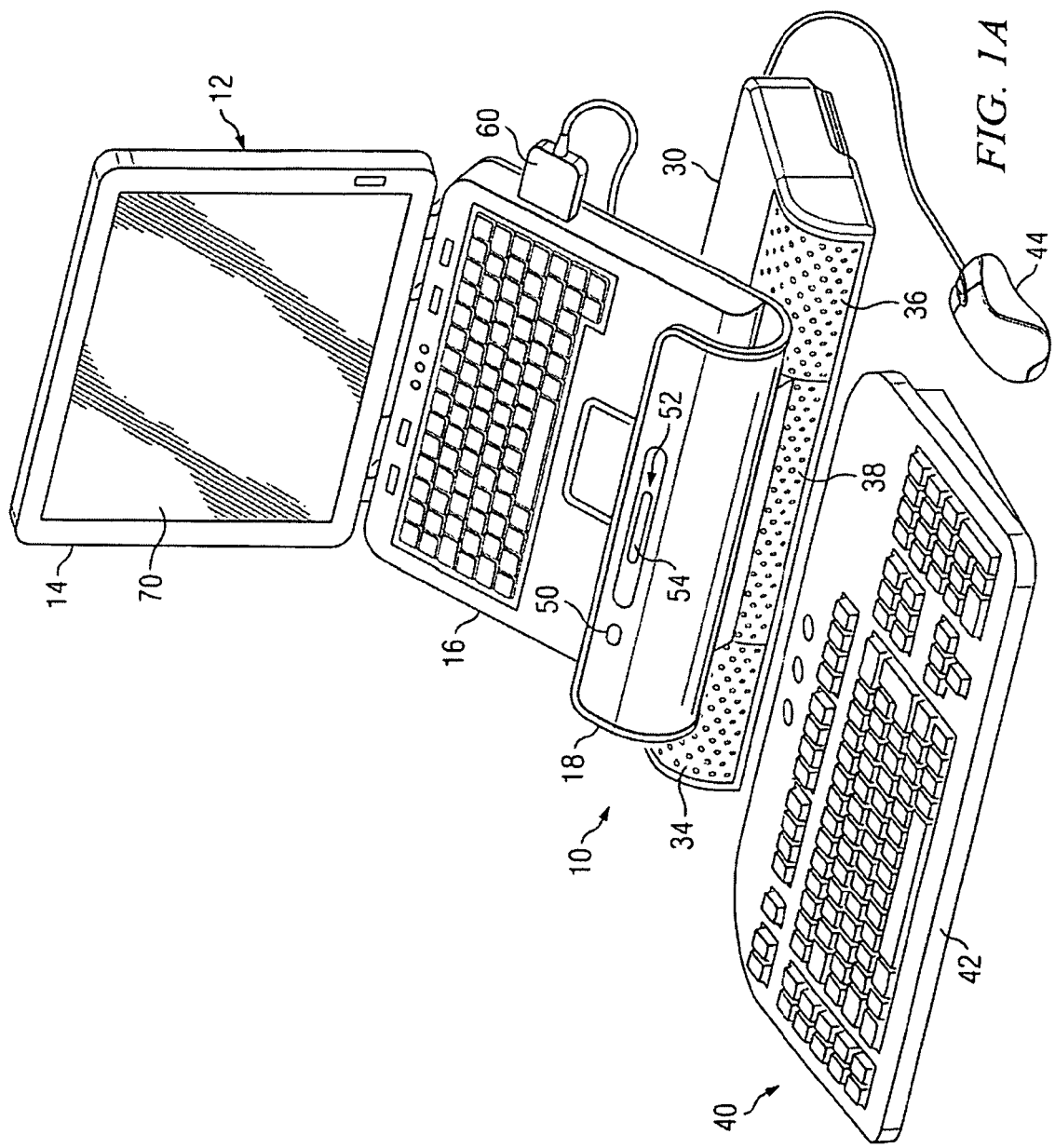
FIGS. 1A and 1B are diagrams illustrating an embodiment of a portable computer docking station with and without, respectively, a portable computer disposed therein in accordance with the present invention.
Figure 1B:
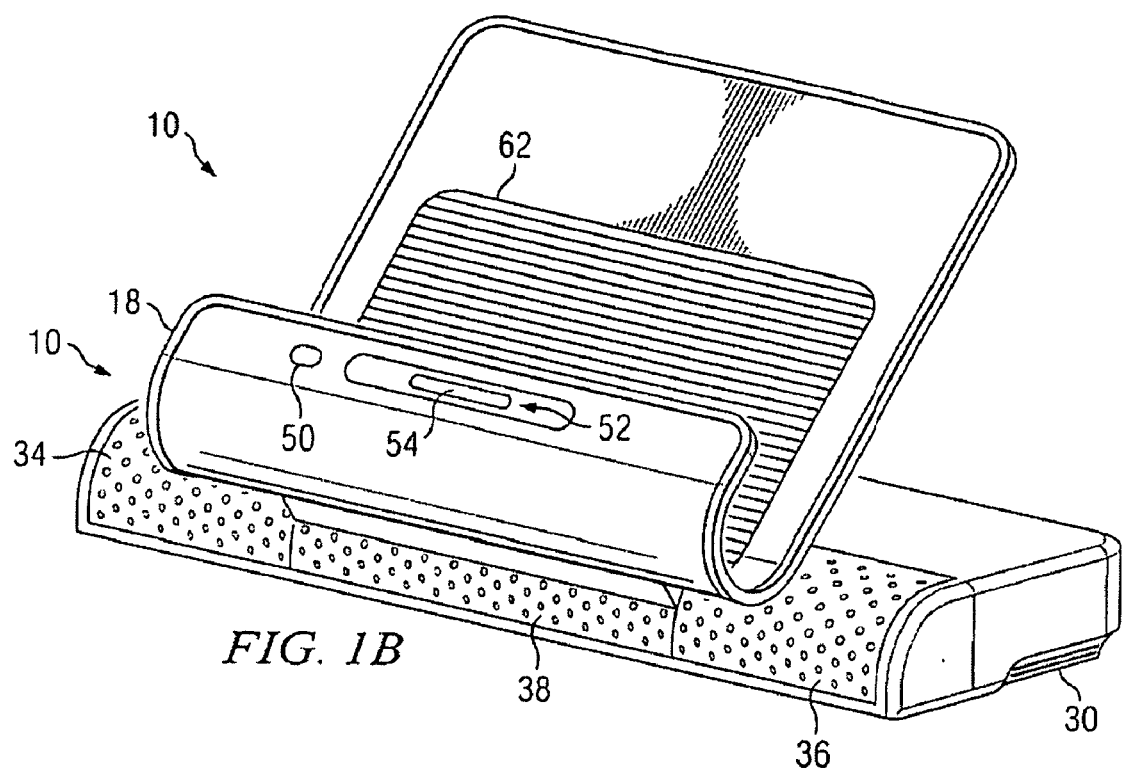

FIGS. 1A and 1B are diagrams illustrating an embodiment of a portable computer docking station 10 in accordance with the present invention with and without, respectively, a portable computer 12 docked thereto. In the embodiment illustrated in FIG. 1A, portable computer 12 comprises a notebook or laptop computer 14 having a base member 16 disposed within a cradle 18 of docking station 10 and a display member 20. In the embodiment illustrated in FIG. 1A, portable computer 12 is illustrated as being docked in docking station 10 having display member 20 in an open position relative to base member 16 such that only base member 16 is disposed within cradle 18, thereby enabling portable computer 12 to be docked in docking station 10 in a display-open position. However, it should be understood that portable computer 12 may also be docked in docking station 10 with display member 20 closed relative to base member 16.

In the embodiment illustrated in FIGS. 1A and 1B, docking station 10 comprises cradle 18 pivotally coupled to a docking base 30. In the embodiment illustrated in FIGS. 1A and 1B, docking base 30 comprises a plurality of audio speakers for providing audio output to a user of docking station 10 based on audio data received or otherwise provided by portable computer 12 and/or another external resource coupled to docking station 10. For example, in the embodiment illustrated in FIGS. 1A and 1B, docking base 30 comprises a left channel audio speaker 34, a right channel audio speaker 36, and a center channel audio speaker 38. However, it should be understood that a greater or fewer quantity of audio speakers may be provided on docking base 30. Further, speakers 34, 36 and 38 may be otherwise located on docking station 10.

Additionally, in some embodiments of the present invention, docking base 30 is configured with a variety of types of devices to facilitate interfacing or otherwise communicating with portable computer 12 and/or other external resources via docking station 10 such as, but not limited to, a hard drive and input/output ports. For example, as illustrated in FIG. 1A, one or more peripheral devices 40, such as, but not limited to, a keyboard 42 and mouse 44, are communicatively coupled to docking station 10 to enable interfacing or otherwise communicating with docking station 10 and/or portable computer 12. Docking station 10 may be configured for wired or wireless communications with external resources such as, but not limited to, a network or peripheral devices 40. For example, as illustrated in FIG. 1A, mouse 44 is coupled to docking base 30 via a wired connection, and keyboard 42 is configured for wireless communications with docking station 10.

In the embodiment illustrated in FIGS. 1A and 1B, docking station 10 comprises a wireless receiver 50 disposed on cradle 18 for facilitating wireless communications between docking station 10 and a user of docking station 10 (e.g., via wireless peripheral devices 40 and/or other devices or control mechanisms). Preferably, wireless receiver 50 is located on cradle 18 to provide greater visibility and/or access to wireless receiver 50 from peripheral devices 40 or other types of devices or control mechanisms. However, it should be understood that wireless receiver 50 may be otherwise located on docking station 10.

In the embodiment illustrated in FIGS. 1A and 1B, at least one control element 52 is disposed on cradle 18 to facilitate control and/or interaction with one or more corresponding features or functions of docking station 10 and/or portable computer 12. For example, in the embodiment illustrated in FIGS. 1A and 1B, control element 52 comprises a slidebar element 54 to facilitate volume or balance control for audio signals emitted by speakers 34, 36 and/or 38. However, it should be understood that control element 52 may be otherwise associated with another feature or function of docking station 10 and/or portable computer 12. In the embodiment illustrated in FIGS. 1A and 1B, a single control element 52 is illustrated; however, it should be understood that a greater quantity of control elements 52 may be provided on docking station 10. Preferably, control elements 52 are located on cradle 18 to facilitate user accessibility to control elements 52. However, it should also be understood that control elements 52 may be otherwise located on docking station 10.

In the embodiment illustrated in FIG. 1A, portable computer 12 is communicatively coupled to docking base 30 via a wired electrical connector element 60. However, it should be understood that docking station 10 may also be configured for wireless communications between portable computer 12 and docking station 10. Additionally, as illustrated in FIG. 1B, docking station 10 comprises a non-skid element 62, such as a rubber pad element or another type of non-skid element, disposed in cradle 18 to stabilize and/or substantially prevent movement of portable computer 12 while disposed within cradle 18. However, it should also be understood that, in other embodiments of the present invention, docking station 10 may be configured without non-skid element 62.

Figure 2A:
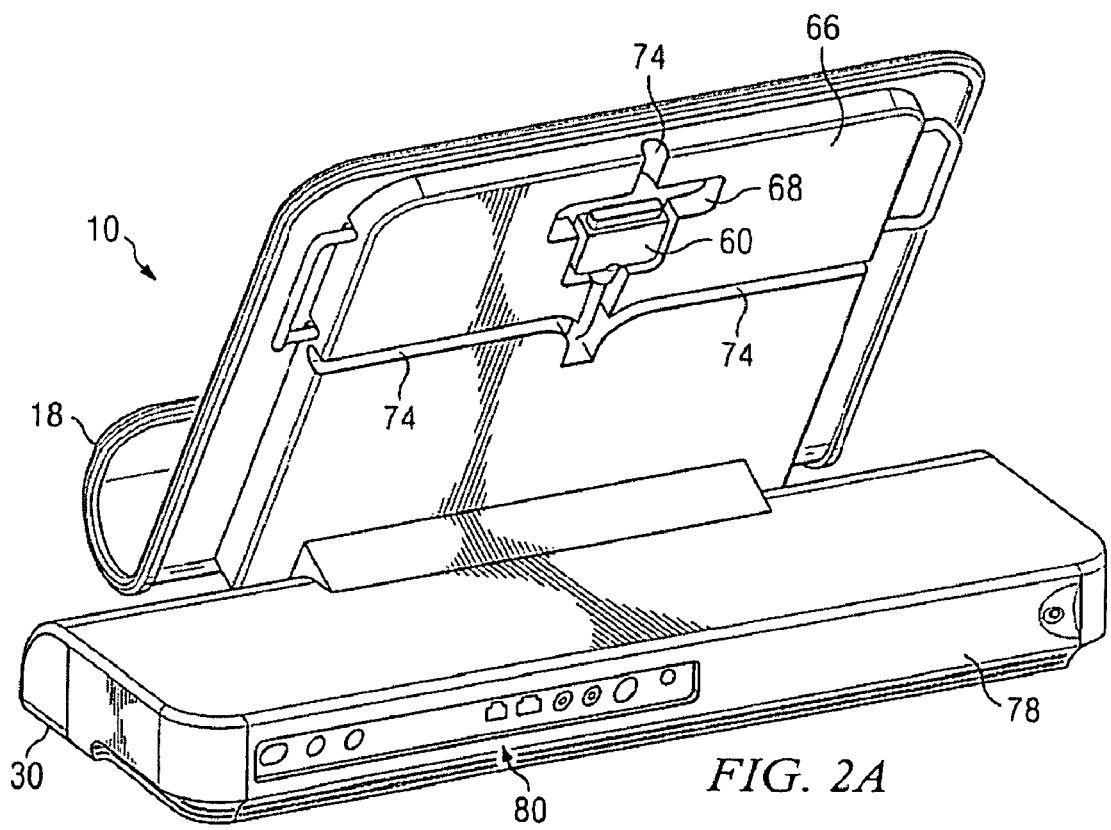
FIGS. 2A and 2B are diagrams illustrating docking of a portable computer to an embodiment of a portable computer docking station in accordance with the present invention.
Figure 2B:
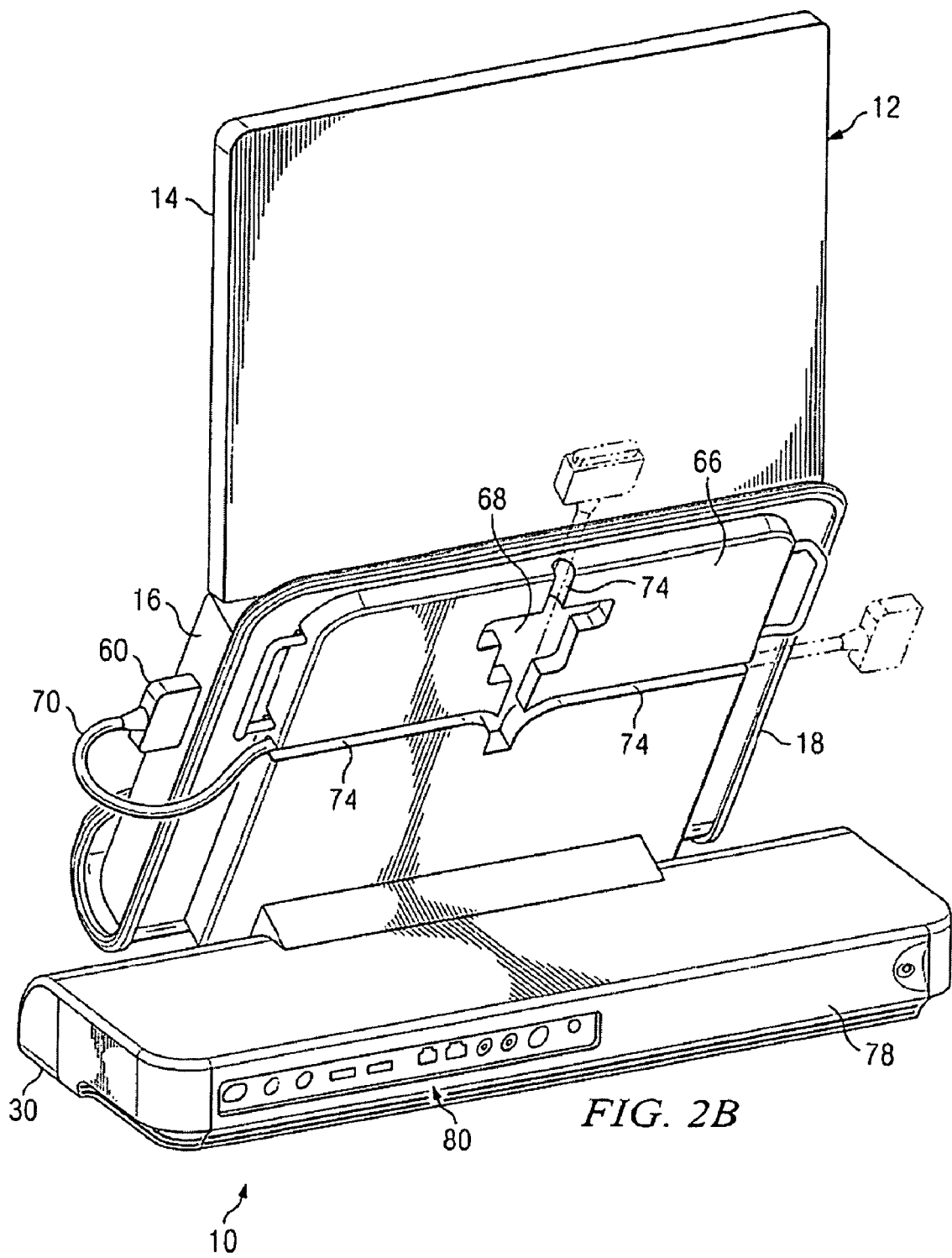

FIGS. 2A and 2B are diagrams illustrating another view of docking station 10 in accordance with an embodiment of the present invention without and with, respectively, portable computer 12 docked thereto. In the embodiment illustrated in FIGS. 2A and 213, connector element 60 comprises a retractable connector element 60 such that connector element 60 may be extended or retracted relative to cradle 18 to facilitate a variety of different connector locations of portable computer 12 for communicatively coupling portable computer 12 to docking station 10. For example, in the embodiment illustrated in FIGS. 2A and 2B, a rearward surface 66 of cradle 18 comprises a recessed area 68 to facilitate storage of connector element 60 in a retracted position. In operation, connector element 60 may be withdrawn from recessed area 68 and pulled outwardly or otherwise extended relative to cradle 18 in a variety of different directions relative to cradle 18 to facilitate engagement with a corresponding connector of portable computer 12. Cradle 18 may be configured with a variety of different types of retraction mechanisms to facilitate retraction or an inwardly biased mechanism for drawing a cable 70 of connector element 60 inwardly into cradle 18 such that, after disengagement of connector element 60 from portable computer 12, or while engaged thereto, excess cable 70 of connector element 60 is automatically retracted into cradle 18 to facilitate convenient storage of connector element 60 within cradle 18 and/or retraction of excess cable 70. However, it should also be understood that docking station 10 may be configured to enable excess cable 70 to be manually retracted or stored within cradle 18.

In the embodiment illustrated in FIGS. 2A and 2B, rearward surface 66 of cradle 18 comprises a plurality of recessed cable channels 74 to facilitate storage of cable 70 therein while connector element 60 is in an extended position relative to cradle 18. In the embodiment illustrated in FIGS. 2A and 2B, three cable channels 74 are illustrated; however, it should be understood that a greater or fewer quantity of cable channels 74 may be provided on cradle 18 to facilitate storage of cable 70 in a variety of different directions relative to portable computer 12.

As illustrated in FIGS. 2A and 2B, a rearward surface 78 of docking base 30 comprises a plurality of input/output ports 80 for communicatively coupling docking base 30 to portable computer 12 and/or other resources such as, but not limited to, a power source, a computer network, peripheral devices 40, a telephone jack connection, auxiliary audio systems or components, and/or other types of devices or resources. However, it should be understood that input/output ports 80 may be otherwise located on docking, base 30. Additionally, connector element 60 is communicatively coupled to docking base 30 to provide communications or otherwise providing an interface between docking base 30 and portable computer 12.

Figure 3:
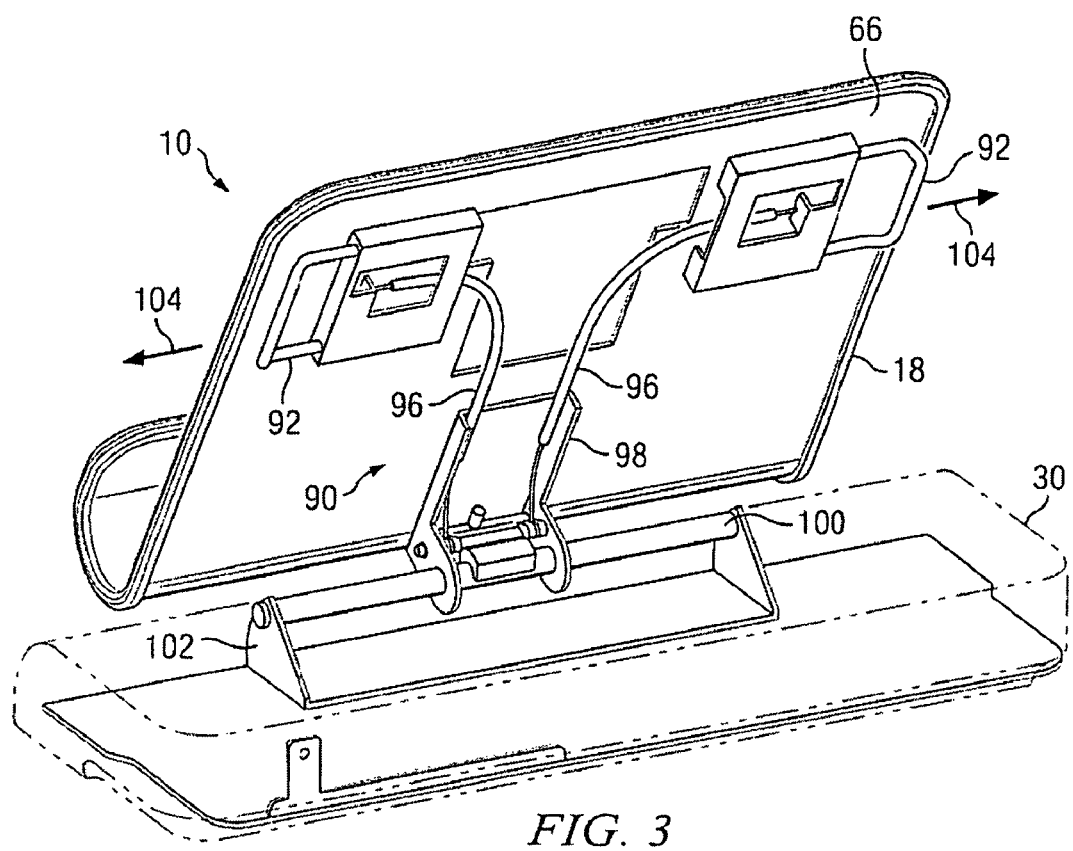
FIGS. 3 and 4 are diagrams illustrating an embodiment of an actuation system for the portable computer docking station of the present invention.

FIG. 3 is a diagram illustrating an embodiment of docking station 10 in accordance with the present invention with portions thereof removed for illustrating an actuation system 90 for facilitating pivotal movement of cradle 18 relative to docking base 30. In the embodiment illustrated in FIG. 3, actuation system 90 comprises a plurality of actuation elements 92 each coupled to a spring-based latch mechanism 96. In the embodiment illustrated in FIG. 3, cradle 18 is pivotally coupled to docking base 30 via a mounting bracket 98 coupled to rearward surface 66 of cradle 18. Mounting bracket 98 is rotatably coupled to a support rod 100, which is in turn coupled to docking base 30 via a support member 102. Spring-based latch mechanisms 96 are coupled to mounting bracket 98 to enable releasable engagement of mounting bracket 98 relative to support rod 100 in a plurality of different pivotal positions to enable cradle 18 to be releasably secured in any of the plurality of pivot positions of cradle 18 relative to docking base 30. In the embodiment illustrated in FIG. 3, two actuation elements 92 and latch mechanisms 96 are illustrated; however, it should be understood that a greater or fewer quantity of actuation elements 92 and latch mechanisms 96 may be used. Additionally, it should be understood that other types of pivotal control systems or mechanisms may be used to provide pivotal movement of cradle 18 relative to docking base 30 and facilitate releasably securing cradle 18 in a desired pivot position relative to docking base 30.

Thus, in operation, to change or otherwise vary a pivot position of cradle 18 relative to docking base 30, a user of docking station 10 engages at least one of actuation elements 92 and actuates the corresponding actuation element 92 in the directed indicated generally by 104. In some embodiments of the present invention, docking station 10 is configured such that actuation of any one of actuation elements 92 causes latch element 96 to disengage relative to support rod 100, thereby enabling pivotal movement of cradle 18 relative to support rod 100. Thus, in such embodiments, actuation of any of actuation elements 92 may be performed via a single hand of the user to facilitate pivotal movement of cradle 18 relative to docking base 30. Accordingly, after actuation of actuation element 92 in the direction indicated by 104, cradle 18 may be pivotally manipulated into any one of a plurality of different pivot positions relative to docking base 30, upon which the user may disengage actuation element 92, thereby causing actuation element 92 to retract in a direction generally opposite that indicated by 104 via spring-based latch mechanism 96, thereby causing latch mechanism 96 to engage and otherwise releasably secure cradle 18 in the desired pivot position relative to docking base 30.

Figure 4:
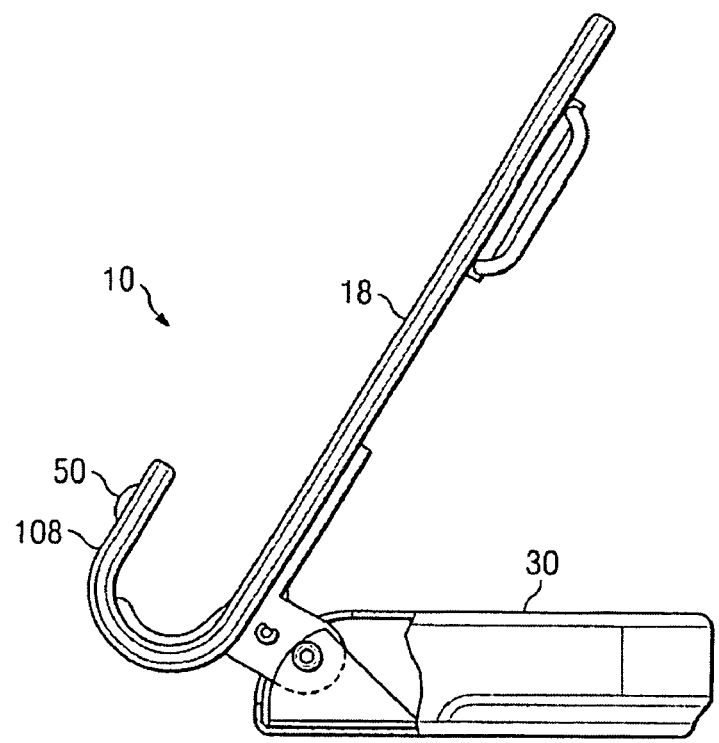
Figure 5:
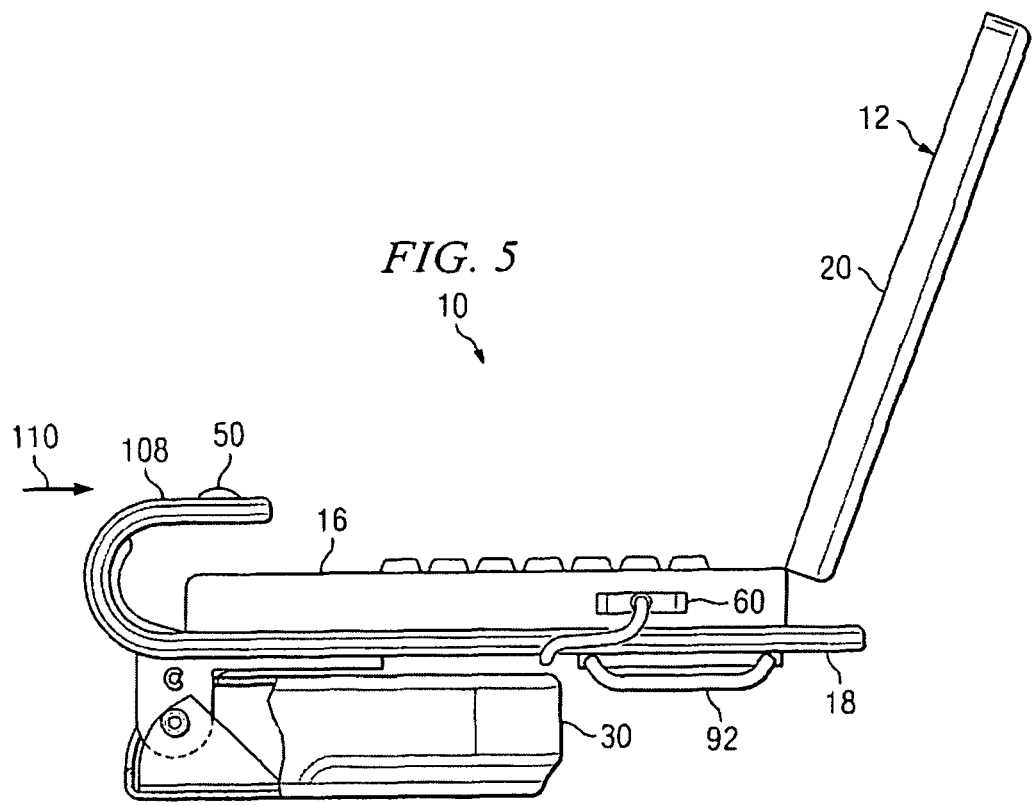
FIG. 5 is a diagram illustrating the embodiment of the portable computer docking station illustrated in FIGS. 1-4 in a reclined position.

FIGS. 4 and 5 are diagrams illustrating an embodiment of docking station 10 in accordance with the present invention having cradle 18 in different pivot positions relative to docking base 30. As illustrated in FIGS. 4 and 5, cradle 18 is configured as a J-shaped cradle 18 to receive and support portable computer 12. However, it should be understood that the shape or geometric form of cradle 18 may be otherwise configured. In the embodiment illustrated in FIGS. 4 and 5, wireless receiver 50 disposed on cradle 18 comprises a bubble-type wireless receiver 50 to enable wireless access to receiver 50 from a plurality of different pivot positions of cradle 18 relative to docking base 30. For example, as illustrated in FIGS. 4 and 5, wireless receiver 50 extends beyond or above an adjacent mounting surface 108 of cradle 18 such that a wireless input signal may be received by wireless receiver 50 while cradle 18 is disposed in each of a plurality of different pivot positions relative to docking base 30. Thus, as illustrated in FIG. 5, where cradle 18 is disposed in a substantially horizontal pivot position relative to docking base 30, wireless receiver 50 remains visible or otherwise accessible to a wireless input signal received from a direction indicated generally by 110.

Figure 7:
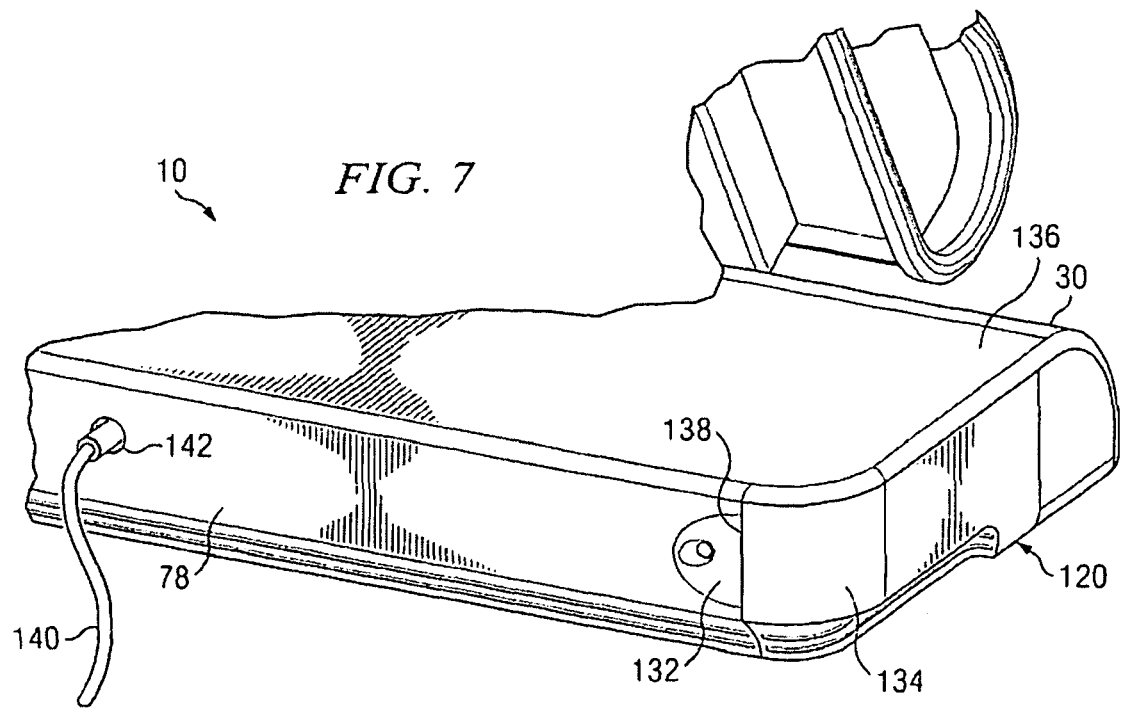
FIG. 7 is a diagram illustrating the drive assembly illustrated in FIG. 6 inserted into the portable docking station in accordance with the present invention.
Figure 6:
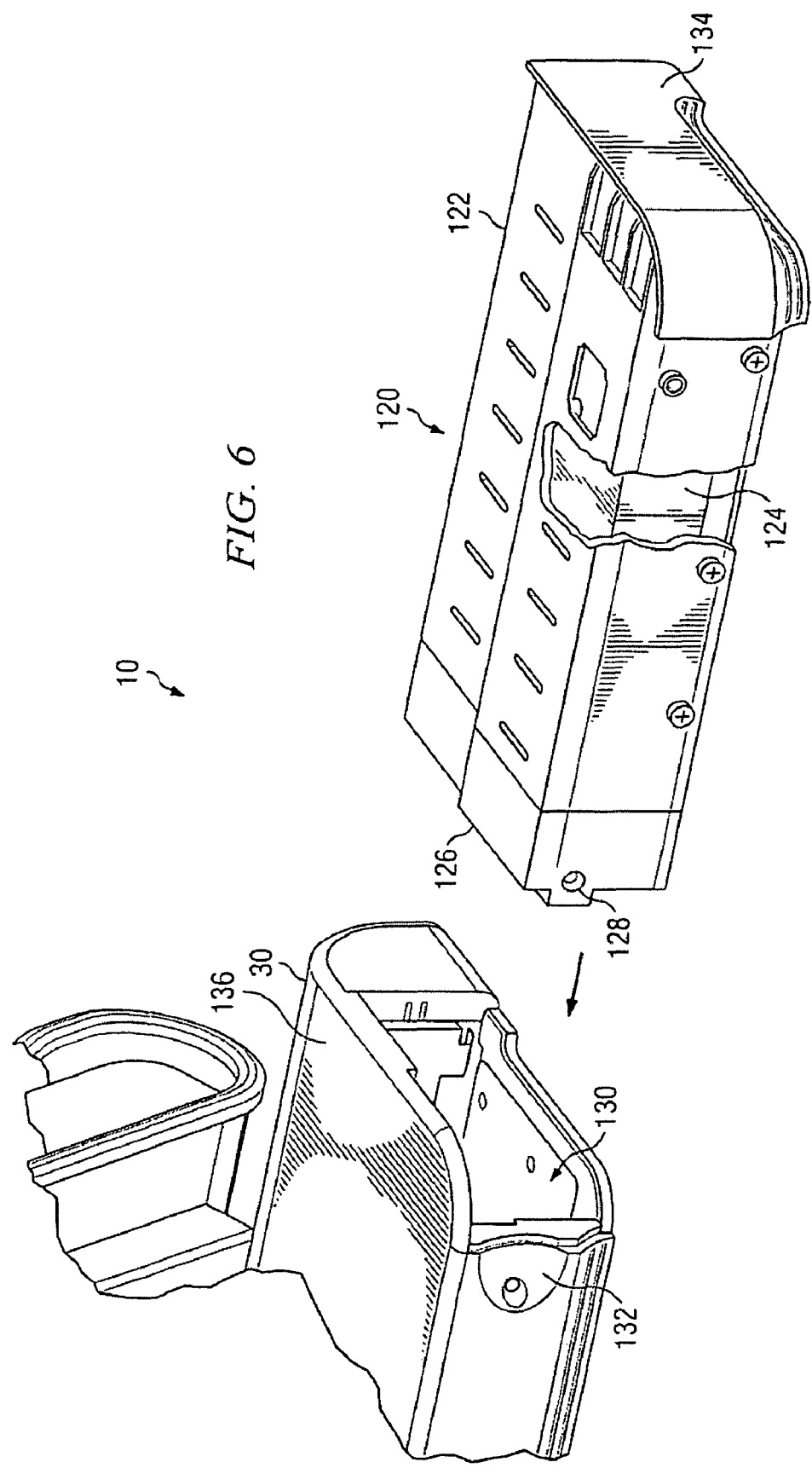
FIG. 6 is a diagram illustrating an exploded view of an embodiment of a drive assembly for the portable computer docking station illustrated in FIGS. 1-5 in accordance with the present invention.

FIGS. 6 and 7 are diagrams illustrating exploded and assembled views, respectively, of a drive assembly 120 relative to docking base 30 in accordance with the present invention. In the embodiment illustrated in FIGS. 6 and 7, docking station 10 is adapted to enable easy interchangeability of drive devices relative to docking base 30 while reducing and/or minimizing the complexity of hardware/software associated with a motherboard of the docking base 30. For example, in the embodiment illustrated in FIGS. 6 and 7, drive assembly 120 comprises a drive enclosure 122 housing a drive device 124. Drive device 124 may comprise any type of drive device such as, but not limited to, a hard drive, an optical drive (e.g., compact disc (CD) and/or digital video disc (DVD) drive) and/or a disk drive. Drive assembly 120 also comprises a connector element 126 adapted to engage and cooperate with a corresponding connector element disposed on a motherboard disposed within docking base 30 (not illustrated).

In the embodiment illustrated in FIG. 6, drive assembly 120 also comprises a power port 128 disposed on connector element 126 to enable an independent power supply to be coupled to drive device 124 when inserted into docking base 30. However, it should be understood that power port 128 may be otherwise located on drive assembly 120. Thus, referring to FIGS. 6 and 7, in operation according to the embodiment illustrated in FIGS. 6 and 7, drive assembly 120 is adapted to be slidably inserted into a drive cavity 130 of docking base 30, thereby engaging connector element 126 with a corresponding connector element coupled to a motherboard disposed within docking base 30 to communicatively couple drive assembly 120 to various hardware/software components of docking base 30.

A variety of types of guides and/or locking elements may be used to guide drive assembly 120 into engagement with components within docking base 30 and releasably secure drive assembly 120 within cavity 130. In the embodiment illustrated in FIGS. 6 and 7, docking base 30 also comprises a recessed portion 132 for readily disengaging and removing drive assembly 120 from docking base 30. For example, in the embodiment illustrated in FIGS. 6 and 7, drive enclosure 122 comprises an exterior housing element 134 adapted to cooperate, preferably mechanically and cosmetically, with a housing 136 of docking base 30. Thus, as illustrated in FIG. 7, cooperation of housing element 134 with recessed portion 132 provides or otherwise enables an edge or portion 138 of housing element 134 to be engaged by a user to disengage and remove drive assembly 120 from docking base 30.

Referring to FIG. 7, a power medium 140 is illustrated for providing power to drive assembly 120. For example, in the embodiment illustrated in FIG. 7, power medium 140 extends through an opening 142 formed in rearward surface 78 of housing 136 to engage power port 128 (illustrated in FIG. 6) of drive assembly. In a preferred embodiment of the present invention, power is supplied to drive assembly 120 via power medium 140 independently of a motherboard or other connection within docking base 30, thereby reducing the complexity, hardware/software, and cost associated with components within docking base 30. However, it should also be understood that system 10 may be otherwise configured such that power for drive assembly 120 is provided via components of docking base 30.

Thus, embodiments of the present invention provide a portable computer docking station 10 enabling a portable computer docked thereto to be positioned in a variety of different angular positions and, if desired, docked in a display-open position. Additionally, embodiments of the present invention provide a portable computer docking station 10 adapted to receive wireless input signals from peripheral devices (e.g., a wireless keyboard or mouse) or another type of wireless transmitter or control mechanism (e.g., a wireless remote control unit) while the cradle 18 of station 10 is disposed in a variety of different pivot positions. Further, embodiments of the present invention enable easy and convenient manipulation of an angular position of a portable computer docked in station 10, thereby providing a user with variety of positions in which to position a display device of the portable computer. Additionally, embodiments of the present invention provide ready interchangeability of a drive device. For example, in some embodiments of the present invention, different types of drive devices 124 are easily interchanged via different drive assemblies 120 to accommodate different media types, different storage requirements, and/or different data sources.

What is claimed is:

1. A portable computer docking station, comprising:
    a cradle pivotally coupled to a docking base, the cradle adapted to receive a portable computer;
    a cable having at least one connector element adapted to releasably engage the portable computer to communicatively couple the portable computer to the docking base, wherein the cable and the at least one connector element extend from and retract into a recessed area to facilitate a variety of different connector locations to the portable computer; and
    at least one actuation element adapted to releasably secure the cradle in at least one of a plurality of pivot positions relative to the docking base, wherein the cradle includes a plurality of recessed channels that store the cable when the cable is in an extended position.

2. The docking station of claim 1, wherein the at least one actuation element is adapted to be actuated by a single hand of a user of the docking station.

3. The docking station of claim 1, wherein the cable automatically retracts back into the recessed area that is located in a back side of the cradle.

4. The docking station of claim 1, further comprising a non-skid element adapted to contact the portable computer while the portable computer is disposed in the cradle.

5. The docking station of claim 1, wherein the cradle comprises a J-shaped cradle.

6. The docking station of claim 1, wherein the cradle comprises three recessed channels that store the cable in a variety of different directions relative to the portable computer.

7. The docking station of claim 1, wherein the docking base comprises at least one audio speaker.

8. A portable computer docking station, comprising:

a cradle pivotally coupled to a docking base, the cradle adapted to receive a portable computer;

a cable having at least one connector element adapted to releasably engage the portable computer to communicatively couple the portable computer to the docking base, wherein the cable and the at least one connector element extend from and retract into a recessed area to facilitate a variety of different connector locations to the portable computer;

at least one actuation element adapted to releasably secure the cradle in at least one of a plurality of pivot positions relative to the docking base; and an interchangeable drive assembly removably couplable to the docking base.

* * * * *